United States Patent [19]

Murakami et al.

[11] 3,810,158

[45] May 7, 1974

[54] DECODING SYSTEM

[75] Inventors: Junzo Murakami, Kawasaki; Shigeo Asakawa, Tokyo; Keiji Takeuchi, Yokohama, all of Japan

[73] Assignee: Tokyo Shibaura Electric Co., Ltd., Kawasaki-shi, Japan

[22] Filed: Dec. 16, 1971

[21] Appl. No.: 208,811

Related U.S. Application Data

[63] Continuation of Ser. No. 859,879, Sept. 22, 1969.

[30] Foreign Application Priority Data

| | | |
|---|---|---|
| July 9, 1968 | Japan | 43-47534 |
| Aug. 13, 1968 | Japan | 43-57125 |
| Aug. 13, 1968 | Japan | 43-57126 |
| Aug. 14, 1968 | Japan | 43-57381 |
| Oct. 26, 1968 | Japan | 43-69116 |
| Oct. 26, 1968 | Japan | 43-69117 |

[52] U.S. Cl. .......... 340/347 DA, 307/243, 307/257, 307/259

[51] Int. Cl. .......... H03k 13/04

[58] Field of Search ...... 340/347 DA; 307/243, 257, 307/259

[56] References Cited

UNITED STATES PATENTS

| | | | |
|---|---|---|---|
| 2,718,634 | 9/1955 | Hansen | 340/347 DA |
| 3,223,992 | 12/1965 | Bentley et al. | 340/347 DA |
| R26,076 | 9/1966 | Bentley et al. | 340/347 DA |
| 3,366,804 | 1/1968 | Heaviside | 340/347 DA |

OTHER PUBLICATIONS

"IBM Technical Disclosure Bulletin", Breedlove, Vol. 3, No. 7, Dec. 1960, pg. 17.

*Primary Examiner*—Charles D. Miller

*Attorney, Agent, or Firm*—Flynn & Frishauf

[57] ABSTRACT

A decoding system comprising a network including a plurality of signal supply terminals respectively corresponding to individual digits in the form of binary code, a signal source generating electric signals of three different values in response to the most significant digit and each corresponding digit, said electric signals being selectively applied to the corresponding signal supply terminals by means of switching circuits.

5 Claims, 30 Drawing Figures

DECODING SYSTEM

This is a continuation, of application Ser. No. 859,879, filed Sept. 22, 1969.

The present invention relates to a PCM signal decoding system converting a digital signal into a corresponding analogue signal.

Digital-to-analog converting circuits used for decoders in receiving apparatus for PCM communication systems, and used for local decoders in feed-back type coders in transmitting apparatus, include a voltage driven ladder resistor network, a current-driven ladder resistor network, a current-driven weighting resistor network, or a weighting current summing network as shown in FIG. 1.

All of these networks, well known as high-speed decoders, convert digital signals into analogue signals by selectively supplying two different values of voltage or current from the source, namely "+E" and "−E" or "+I" and "−I", for each bit of the digital signal.

These digital-to-analogue converting networks require very severe restrictions upon the values of their resistors and the voltage or current sources in order to obtain sufficient decoding precision.

Especially in a voice PCM communication system in which digital compressing and expanding or companding is used for improvement of the quantization noise characteristics, there is required an extremely strict decoding precision in the vicinity of the zero level of the analogue voice signals. Thus, when the conventional decoding system is used, the required resistor and voltage or current source precision would take an impracticable value as is described hereinafter more in detail.

By way of example, a prior art voltage-driven ladder resistor network as shown in FIG. 2A and in FIG. 2B will be described. The illustrated network includes voltage sources $E_0, E_1, \ldots, E_{n-1}$, respectively corresponding to different bits of the digital signal. These sources are switched to supply either one of the voltage values "+E" and "−E" by means of switches $S_0, S_1, \ldots, S_{i-1}, S_i, S_{i+1}, \ldots, S_{n-1}$ as shown in FIG. 2B. To the voltage sources $E_0, E_1, \ldots, E_{n-1}$, are connected associated resistors each having a resistance value of 2R. These resistors are connected together through resistors having a resistance value of R. To the extreme terminal of the network are connected resistors such that the resultant resistance is 2R.

It is now assumed that in the voltage-driven ladder resistor network shown in FIG. 2A the errors of the parallel arm resistors are respectively $\delta_0, \delta_1, \ldots, \delta_{n-1}$ and the errors of the series arm resistors are respectively $\delta_1', \ldots, \delta_{n-1}'$, and that the voltage sources have no error. The code digital signal is represented by natural binary $n$-bit digital symbol $(C_0\, C_1 \ldots C_{n-1})$, with $C_0$ being the most significant digit and $C_{n-1}$ being the least significant digit.

Switches $S_i$ $(i=0, 1, \ldots, n-1)$ are operated in accordance with the values of respective bits $C_i$ $(i = 0, 1, \ldots, n-1)$, whereby "+E" or "−E" is selected corresponding to the value of $C_i$ being "1" or "0" respectively. It is of course possible to make the digital values of "1" and "0" correspond to the voltage 2E and 0, respectively. However, the following description will be given in connection with the voltages +E and −E.

The voltage value $E_i$ the voltage sources is $$E_i = (2C_i - 1)E = \alpha_i E \qquad (1)$$

where $\alpha_i = (2C_i - 1)$ with $i = 0, 1, \ldots, n-1$. Thus, the voltage $E$out at output terminal P is expressed as $$E_{\text{out}} = \frac{E}{2^{n+1}} \sum_{i=0}^{n-1} \alpha_i 2^{n-1}(1+\Delta_i) \qquad (2)$$

where $\Delta_i$ is the error (or deviation) of the output voltage from the theoretical value. Denoting the maximum absolute values of resistance errors $\delta_0, \delta_1, \ldots, \delta_{n-1}$ and $\delta_0', \delta_1', \ldots, \delta_{n-1}'$ by $\delta_v$ the error $\Delta_i$ results in $$|\,\Delta_i\,| \leq (i+1)\delta_v,\ i = 0, 1, \ldots, n-1 \qquad (3)$$

As the precision in the vicinity of 0-level of the analogue signal is particularly important for digital companding, the errors in this vicinity will be considered. The digital signals corresponding to the closest 0-level (center level) vicinity of the analogue signal are (100 . . . 00) and (011 . . . 11). The analogue signal output corresponding to digital signal (100 . . . 00) is $$(\underset{\text{analogue}}{\underline{100\ldots00}}) = E/2^{n+1}[2^n(1+\Delta_0) - 2^{n-1}(1+\Delta_1) - \ldots - 2^2(1+\Delta_{n-2}) - 2(1+\Delta_{n-1})] \qquad (4)$$

And that corresponding to digital signal (011 — 11) is $$(\underset{\text{analogue}}{\underline{011\ldots11}}) = E/2^{n+1}[-2^n(1+\Delta_0) + 2^{n-1}(1+\Delta_1) + \ldots + 2^2(1+\Delta_{n-2}) + 2(1+\Delta_{n-1})] \qquad (5)$$

The difference between the two analogue value is known from equations (4) and (5), $$(\underset{\text{analogue}}{\underline{100\ldots00}}) - (\underset{\text{analogue}}{\underline{011\ldots11}}) = E/2^{n-1}[2^{n-1}(1+\Delta_0) - 2^{n-2}(1-\Delta_1) - \ldots - 2(1+\Delta_{n-2}) - (1+\Delta_{n-1})]$$
$$= E/2^{n-1}[1 + 2^{n-1}\Delta_0 + 2^{n-2}\Delta_1 - \ldots - 2\Delta_{n-2} - 2\Delta_{n-1}] \qquad (6)$$

As the ideal difference is equal to the unit step value $E/2^{n-1}$, the error $\Delta$ is $$\Delta = 2^{n-1}\Delta_0 - 2^{n-2}\Delta_1 \ldots - 2\Delta_{n-2} - \Delta_{n-1} \qquad (7)$$

Substitution of equation (3) into equation (7) gives $$|\Delta| \leqq 2^{n-1}\delta_v + 2^{n-2}\cdot 2\delta_v + \ldots + 2(n-1)\delta_v + n\delta_v = \delta_v \sum_{k=1}^{n} k\cdot 2^{n-k} \qquad (8)$$

Thus, if the absolute error $|\Delta|$ is to be held within $1/b$ of the unit step in the neighborhood of the 0-level of the analogue signal, equation (8) restricts the maximum error $\delta_v$ of the resistors to $$\delta_v \leqq \frac{1}{B \times \sum_{k=1}^{n} k\cdot 2^{n-k}} \qquad (9)$$

where $1/B$ is the error allowance.

By way of example, $\delta_v$ of an 11-bit natural binary code decoder having a error allowance of 1/10, from equation (9)

$$\delta_v \leqq 2.45 \times 10^{-5} = 0.00245 \text{ percent} \qquad (10)$$

Analogously, denoting the maximum error of resistors constituting a current-driven ladder resistor network by $\delta_I$, $$\delta_I \leqq 4 \times 10^{-5} = 0.004 \text{ percent} \qquad (11)$$

In either case it is practically impossible to provide resistors meeting the above precision requirement. The impossibility becomes further evident from the consideration of changes in resistance with temperature and time. Furthermore, the residual resistance of the switching circuits for the voltage sources and the stability of the reference voltage dictate an even higher degree of precision than the values given by equations (10) and (11).

These facts also substantially may be applied to other decoding circuits or networks such as a current-driven weighting resistor network.

The above disadvantages inherent to the conventional digital-to-analogue converting systems are found to stem chiefly from selectively supplying the network with two voltage or current values depending upon the values $C_i$ of individual bits of the digital signal.

The object of the present invention is to overcome the foregoing disadvantages by the provision of a decoding system comprising a network including a plurality of signal supply terminals respectively corresponding to individual digits in the form of binary code, a signal source generating electric signals of three different values, and switching circuits selectively providing one of said electric signals of three different values in response to the most significant digit signal, each corresponding to each digit, to the corresponding signal supply terminals.

This invention can be more fully understood from the following detailed description when taken in conduction with the accompanying drawings, in which.

Figure 1:
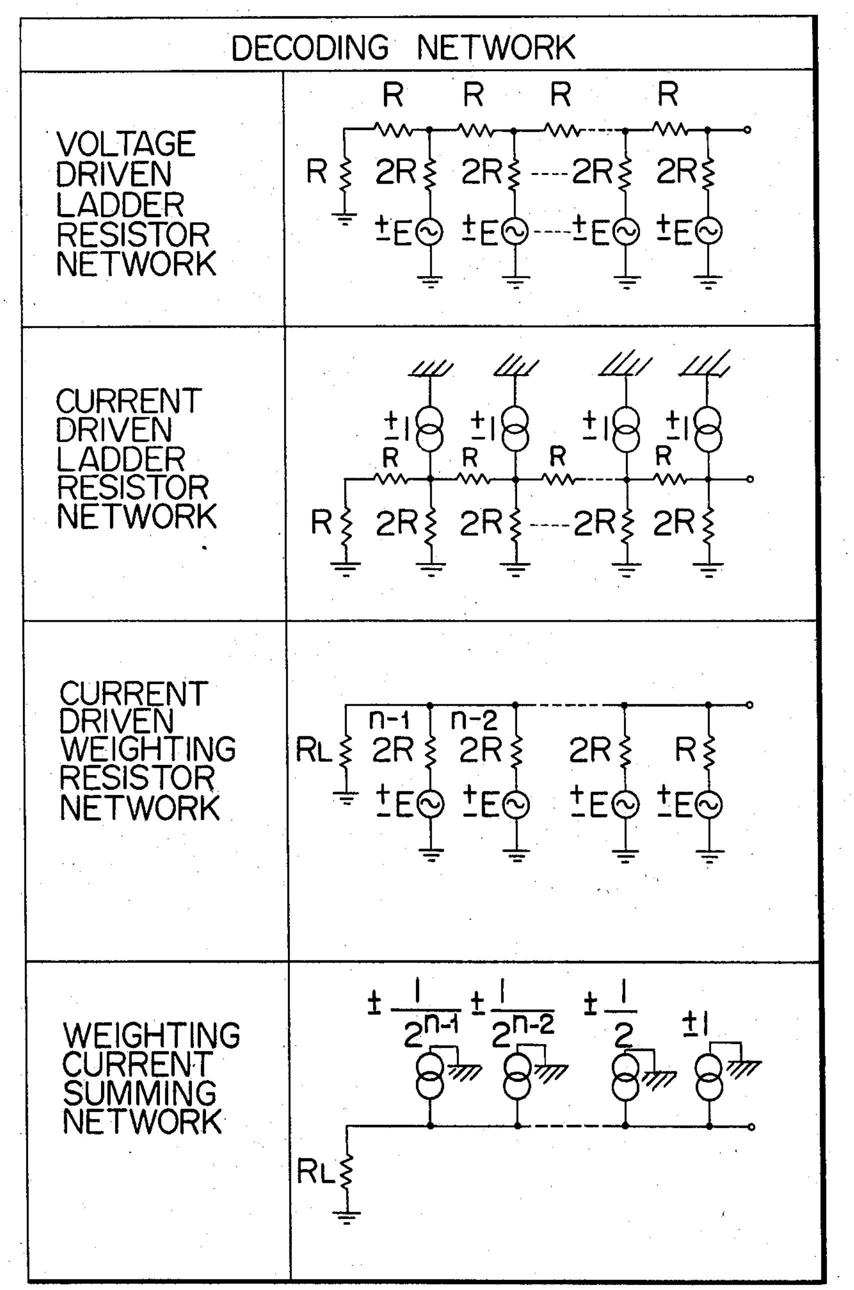
FIG. 1 illustrates conventional digital-to-analogue converting networks.
Figure 2A:
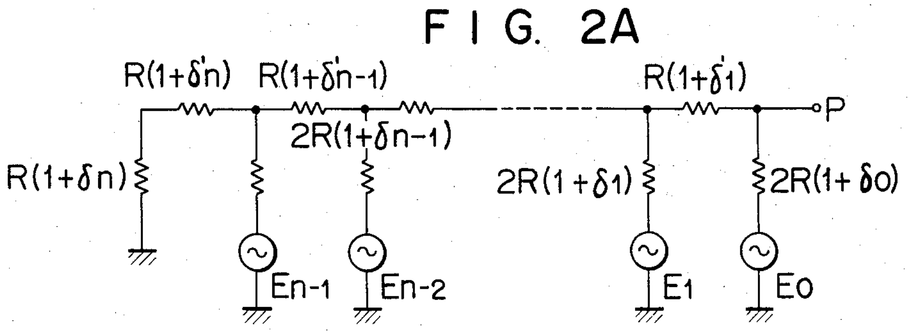
FIGS. 2A and 2B illustrate the principles of the operation of the conventional current-driven ladder resistor network.
Figure 2B:
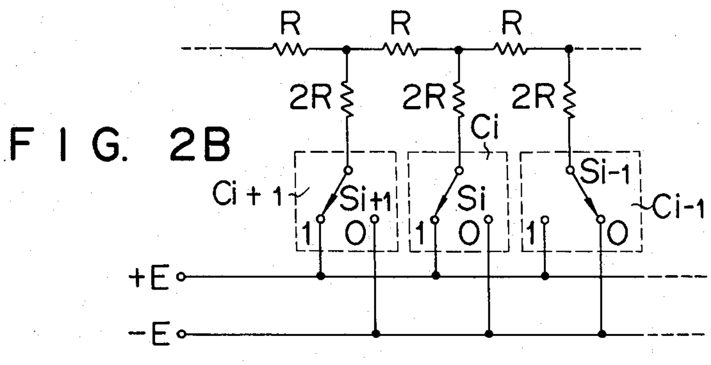
Figure 3A:
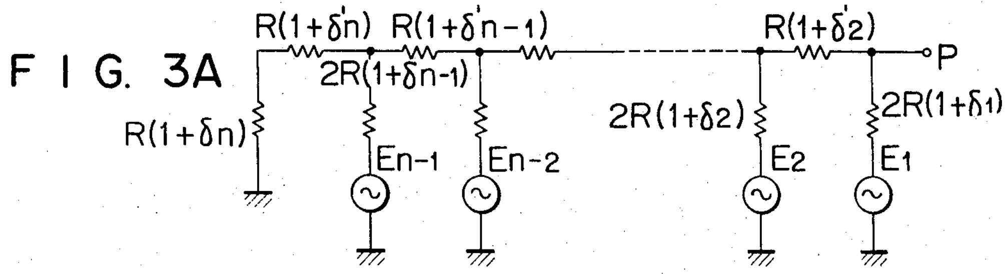
FIGS. 3A and 3B illustrate the principles of the operation of a digital-to-analogue converting network according to the present invention.
Figure 3B:
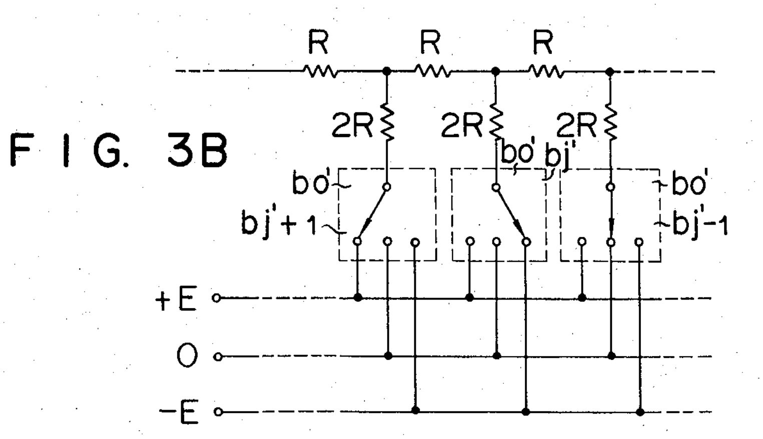

The feature of the digital-to-analogue converting system according to the invention, different from the conventional decoding system of this type, is based upon the principle that three different values of voltage such as "$+E$", "$O$" and "$-E$" as shown in FIG. 3B or those of current such as "$+I$", "0" and "$-I$" are available corresponding to the values of each bit $C_j$ and $C_O$ of the digital signal. The outstanding advantage of the decoding system according to the invention will become more apparent from the following description. Throughout this specification $E$ represents voltage and $I$ represents current. However, in the claims the term $E$ is used to denote an electrical signal value of either voltage or current.

It is now assumed that the control of each switch for a voltage-driven ladder resistor network conforms to the logical relations according to the invention, that is, for a digital signal in the form of natural binary code $(C_0\ C_1\ C_2 \ldots C_{n-1})$ i. when $C_O = O$ and $C_j = O$, $E_j = -E$,
ii. when $C_O = l$ and $C_j = l$, $E_j = +E$,
iii. when $C_O = l$ and $C_j = O$, $E_j = O$, and
iv. when $C_O = O$ and $C_j = l$, $E_j = O$. (12)

where $j = 1, 2, \ldots, n-1$.

Then, the j-th voltage $E_j$ as shown in FIG. 3A is $$E_j = (2C_O - 1)\,(C_O C_j + \bar{C}_O \bar{C}_j)E \qquad (13)$$

Thus, the output voltage $E$out at terminal $P$ is expressed as $$E_{\text{out}} = (2C_0 - 1)E \sum_{j=1}^{n-1} \frac{C_0 C_j + \bar{C}_0 \bar{C}_j}{2^j} \qquad (14)$$

where $j = 1, 2, \ldots, n-1$.

The analogue signal outputs corresponding to natural binary signals (100 . . . 00) and (011 . . . 11) are obtained by equation (14) as follows.

$$\underset{\text{analogue}}{(100 \ldots 00)} = \underset{\text{analogue}}{(011 \ldots 11)} = 0 \qquad (15)$$

As is seen from equation (15), these digital signals are independent of the precision of the resistors.

Also, the analogue output corresponding to digital signal (100 . . . 01) which is one step above digital signal (100 . . . 00) is given as $$\underset{\text{analogue}}{(100 \ldots 01)} = (E/2^{n-1})(1 + \Delta_{n-1}) \qquad (16)$$

Similarly, the analogue output corresponding to digital signal (011 . . . 10) which is one step below digital signal (011 . . . 11) is $$\underset{\text{analogue}}{(011 \ldots 10)} = (-E/2^{n-1})(1 + \Delta_{n-1}) \qquad (17)$$

As is apparent from equations (16) and (17), the absolute value of the relative error $\Delta$ becomes $$|\Delta| \leqq |\Delta_{n-1}| \leqq n\delta_v \qquad (18)$$

Thus, if the absolute error $|\Delta|$ is to be held within $1/B$ of the unit step in the neighbourhood of 0-level of the analogue signal, the maximum error $\delta_v$ of the resistors becomes $$\delta_v \leqq 1/nB \qquad (19)$$

where $1/B$ is the error allowance.

By way of example, for $n = 11$ ($n$-bit digital signal) and $(1/B) = (1/10)$, $$\delta_v \leqq 9.1 \times 10^{-3} = 0.91 \text{ percent} \qquad (20)$$

is obtained.

Under the same conditions the maximum error $(\delta)_I$ of the resistors constituting a current-driven ladder resistor network is $$\delta_I \leqq 1.3 \times 10^{-3} = 0.13 \text{ percent} \quad (21)$$

Setting of the error within these ranges may be easily realized with ordinary resistors. The described decoding system is particularly effective for the decoding of digital signals containing a great quantity of information to corresponding analogue signals. It may also be applied to current-driven weighting resistor networks and weighting current summing networks in addition to the foregoing voltage-or current-driven ladder resistor networks.

Figure 4A:
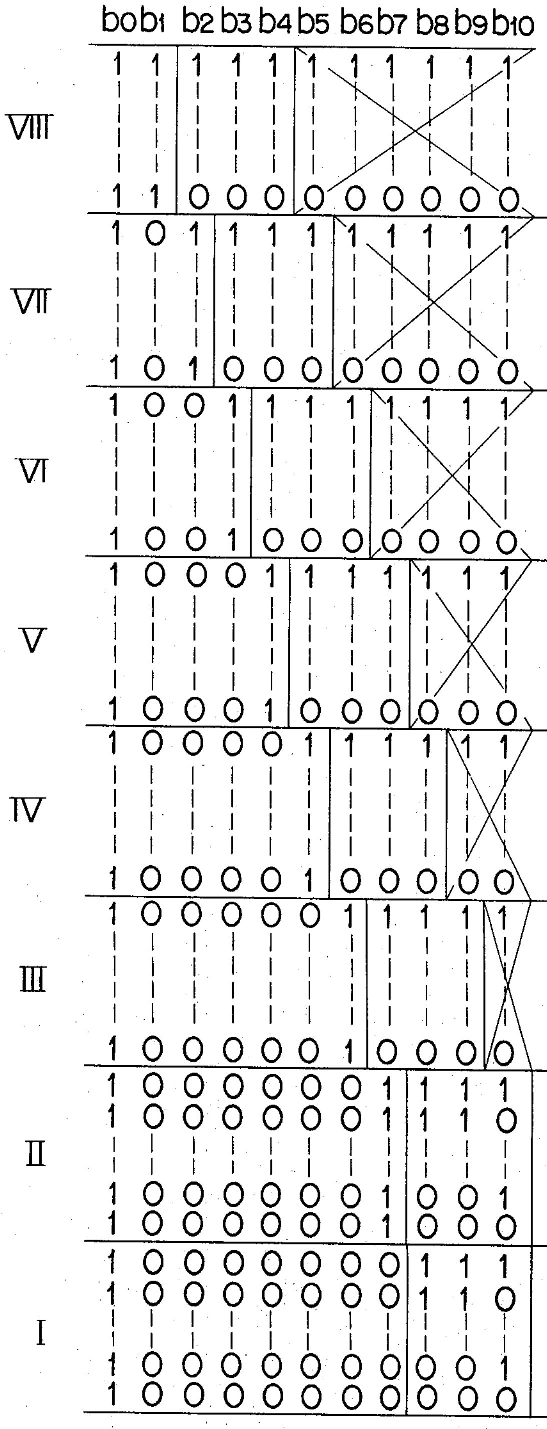
FIGS. 4A to 4C show binary charts analyzing the digital compression and expansion.

Prior to describing detailed embodiments of the decoding system according to the principles of this invention, an explanation of digital companding is first given as it is carried out in the preceding stage of the decoding network for the purpose of improving the quantization noise characteristics. The case of 7-bit-binary-coding of a voice signal is now considered. This is performed by 11-bit-linear-binary-coding of the analogue signal by the compression of 11 digits into 7 digits by a logical procedure. The compression is accomplished by omitting lower digits of the digital signal as the analogue input level increases. FIG. 4A represents digital signals as the input to the digital compressor in the form of a folded binary code. The most significant digit $b_0$ represents the polarity of the analogue input value, with "1" indicating positive and "0" indicating negative. $b_1$ or the other digits are symmetrical with respect to the zero or center level of the analogue signal. Therefore the chart of FIG. 4A covers only $b_0 = 1$ or the positive region which is divided into segments I, II, . . . , VIII which are arranged in the order of analogue input levels nearer to 0-level; segment I consists of $2^3$ binary codes from (10000000000) to (10000000111), segment II consists of $2^4$ binary codes, . . . , and segment VIII consists of $2^{10}$ binary codes.

For the purpose of compressing the 11-bit digital signals in FIG. 4A into 7-bit digital signals, 3-bits of each segment above the omitted bits shall be made effective. Segments I and II are not subject to the bit omission, for segment III the least significant bit is omitted, and the 2, 3, . . . , and 6-bits from the least significant bit are omitted for successive segments IV to VIII respectively.

As the probability density of voice level decreases with increasing level, it has been proved that the quantization noise characteristic may be improved by more finely quantizing at the low level where the probability density is high.

Figure 4B:
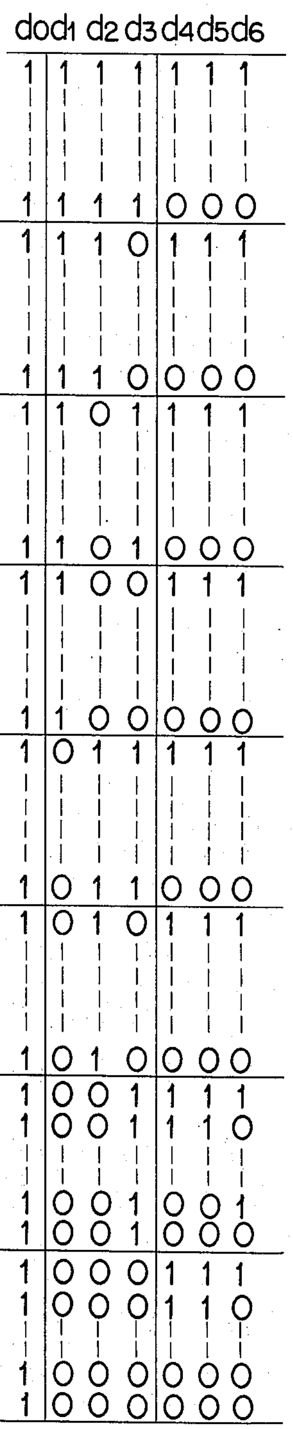

The resultant outputs of the digital compressor are 7-bit signals as shown in FIG. 4B, where the most significant bit $d_0$ remains equal to $b_0$ of the signals before compression, the following successive three bits $d_1$ to $d_3$ indicate the segment to which the signal belongs; that is (000) for segment I, (001) for segment II, (010) for segment III, . . . , and (111) for segment VIII, and the remaining three bits $d_4$ to $d_6$ become effective bits in each segment. Thus outputs $(d_0\ d_1 \ldots d_6)$ include $2^3$ binary codes in each segment.

The regeneration of an analogue signal from the compressed code is performed as follows. First the 7-bit digital signals are introduced into the digital expander, where they are converted to 11-bit digital signals. The lower bits in each segment which have beem omitted by the compressor are indefinite at the output of the expander. By way of example, when $(d_0\ d_1\ d_2 \ldots d_6) = (1011101)$, from $b_0' = d_0 = 1$ and $d_1, d_2, d_3 = 011$ (segment IV), there is determined $(b_0'\ b_1'\ b_2'\ b_3'\ b_4'\ b_5') = 100001$ and $(b_6'\ b_7'\ b_8') = (d_4\ d_5\ d_6) = (101)$ where $(b_0'\ b_1' \ldots b_{10}')$ is an expanded digital signal. However, digits $b_9'$ and $b_{10}'$ are not determined, for the two digits in segment IV have been omitted by the compressor. Accordingly, it is necessary to select any one of (00) (01) (10) and (11) for $b_9'$, $b_{10}'$. To expand the digital signal with a minimum of error a value nearest to the center of the omitted level range is taken. Thus, $$(b_9'\ b_{10}') = (10)$$

and the expanded digital output signal is $(b_0'\ b_1'\ b_2' \ldots b_{10}') = (10001101110)$.

Figure 4C:
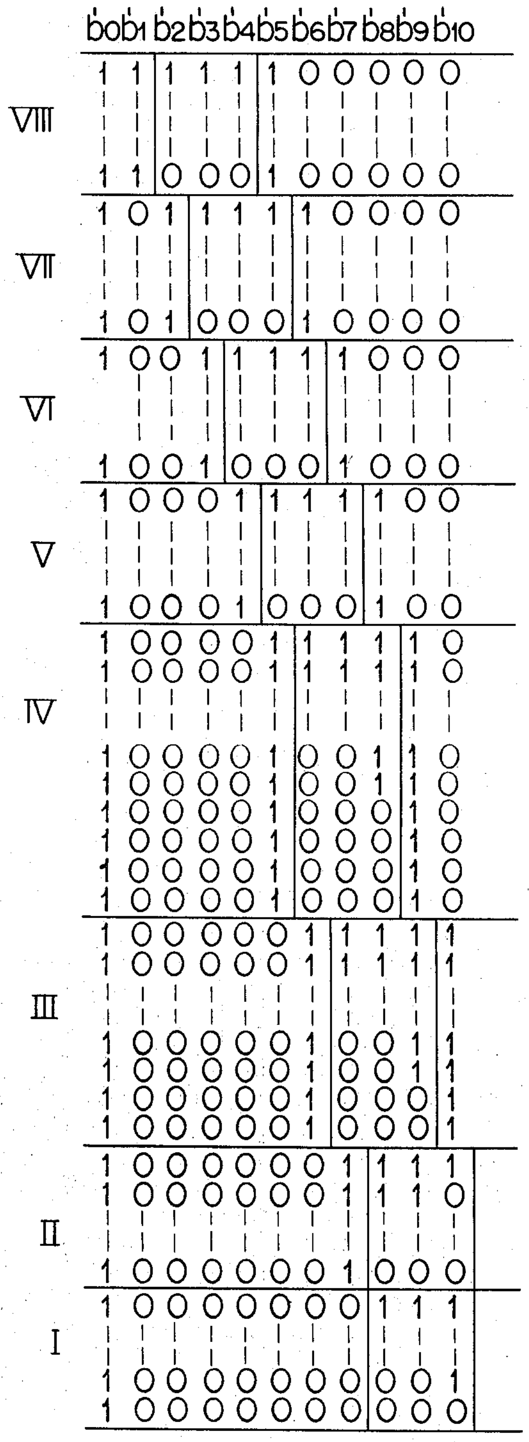

Selecting the value nearest to the center of the omitted level range for each segment, the expanded digital signal as shown in FIG. 4C becomes the input signal to the decoder.

The relation between the folded binary code $(b_0\ b_1 \ldots b_j \ldots b_{n-1})$ and the natural binary code $(C_0\ C_1 \ldots C_j \ldots C_{n-1})$ is expressed as $b_0 = C_0$ and $$b_j = C_0C_j + \bar{C}_0\bar{C}_j \quad (22)$$

where $j = 1, 2, \ldots, n-1$.

As is seen from the equation (22) there are certain relations between both of the binary coding systems, a selected coding system and can be converted to the other, if necessary, by suitable conversion logical circuits.

Figure 5:
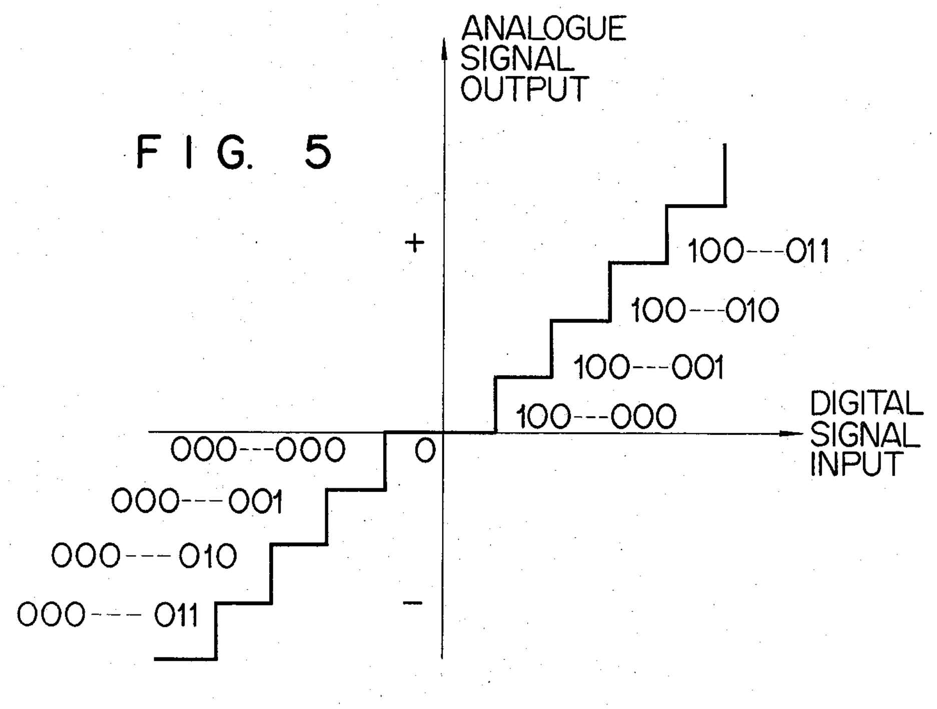
FIG. 5 is a plot for the decoding characteristic of the network shown in FIGS. 3A and 3B.

Thus, the following description is mainly concerned with the folded binary codes having a symmetrical characteristic. Consideration is first given to the decoding characteristic of the output from the voltage-driven ladder resistor circuit shown in FIG. 3 in the vicinity of 0-level. It is assumed that the digital companding is carried out in accordance with the charts of FIGS. 4A to 4C. FIG. 5 shows the digital signal input taken along the $x$-axis and the analogue signal output taken along the $y$-axis for a portion of segment I. The analogue signal output for the folded binary digital input signal is theoretically given from equations (14) and (22) as $$E_{out} = (2b_0' - 1)E \sum_{j=1}^{n-1} \frac{b_j'}{2} \quad (23)$$

where $j = 1, 2, \ldots, n$.

For the analogue signal outputs corresponding to digital signal inputs (100 . . . 00) and (011 . . . 11) there is obtained:

$$(100 \ldots 00)_{\text{analogue}} = (011 \ldots 11)_{\text{analogue}} = 0$$

The circuit shown in FIG. 3 having the decoding characteristic shown in FIG. 5 is, of course, sufficient for practical use, in spite of being connected in common at the analogue signal output corresponding to the above digital signals.

Figure 6:
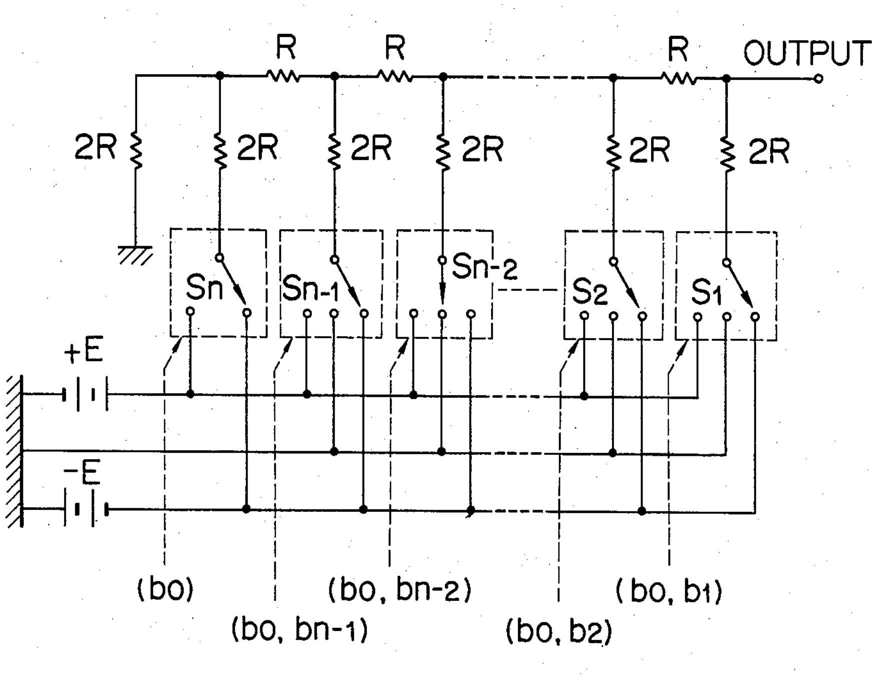
FIG. 6 is a circuit diagram showing another embodiment of the digital-to-analogue converting network according to the invention.

An improvement of the circuit shown in FIG. 3 is shown in FIG. 6. It includes a separate switch $S_n$ controlled by the values of the most significant digit $b_0'$ in addition to switches $S_j$ $(j = 1, 2, \ldots, n-1)$ which are controlled in the same manner as the switches in the circuit of FIG. 3.

The control of switch $S_n$ satisfies the logic conditions that the output of switch $S_n$ is $+E$ for $b_0' = 1$ and $-E$ for $b_0' = 0$ (24)

Addition of a supplementary term derived from conditions (24) substituted into equation (23) gives $$E_{out} = (2b_0' - 1)\,E \sum_{j=1}^{n-1} \frac{b_j'}{2} + (2b_0' - 1)\,\frac{E}{2^n} \qquad (25)$$

Figure 7:
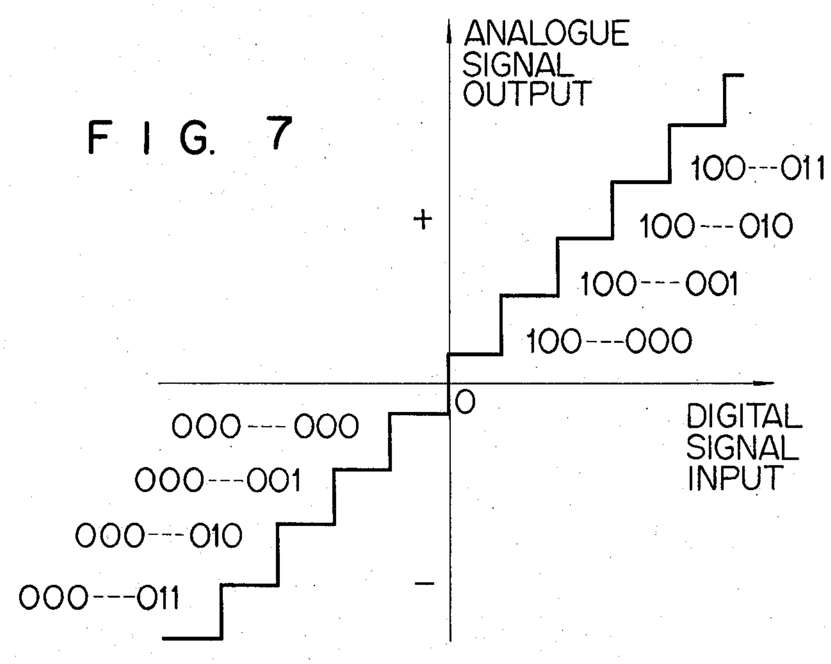
FIGS. 7 and 8 are plots for the decoding characteristic of the network shown in FIG. 5.
Figure 8:
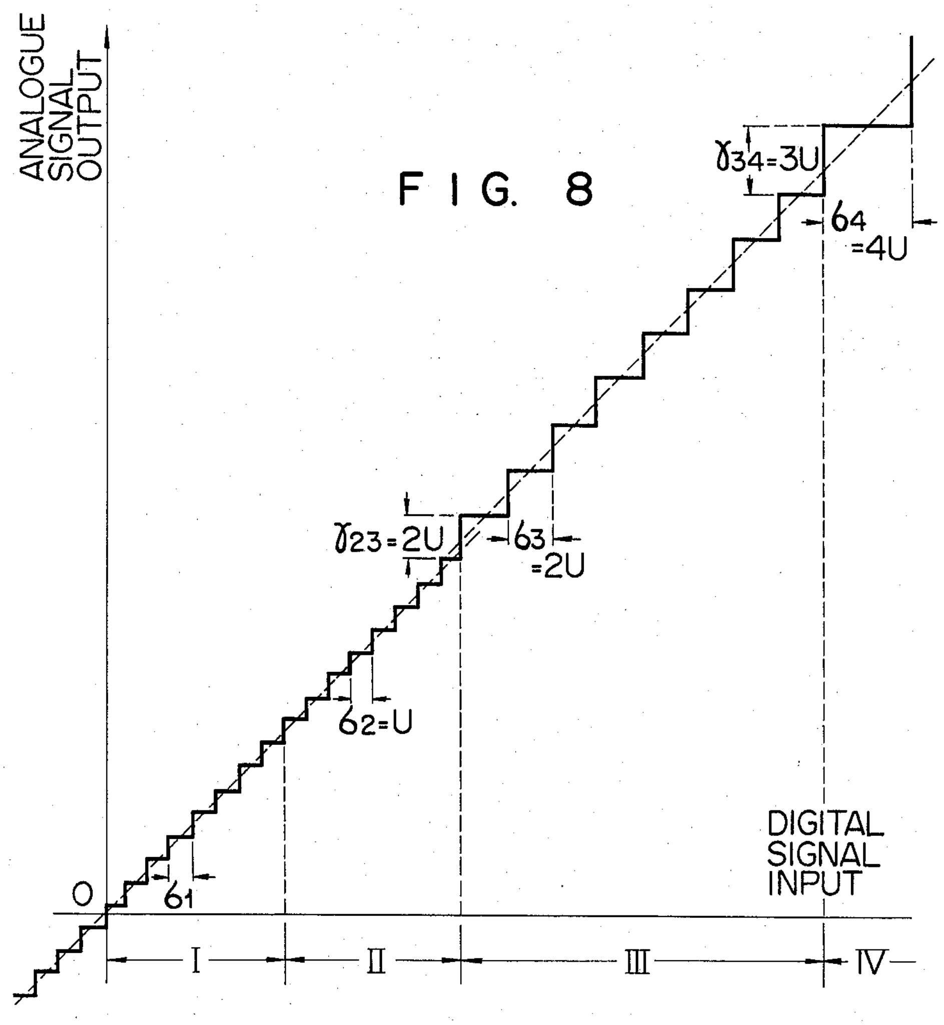

The decoding characteristic of the circuit shown in FIG. 6 and represented by equation (25) is shown in FIG. 7 where the $x$-axis is also taken for the digital signal input and the $y$-axis is taken for the analogue signal output. FIG. 7 also shows only a portion of the decoding characteristic. The decoding characteristic for segments I to IV is shown in FIG. 8. This characteristic is not only peculiar to digital companding, but is also applicable for other well known companding systems.

The folded types of companding systems tend to generate third-order distortions (non-linear distortion). With the circuit shown in FIG. 6 only on the boundary between segments II and III is there a discrepancy of mean values as is seen from the decoding characteristic of FIG. 8, which is the cause of the third-order distortions.

Unit step for segments I and II is $\sigma_1 = 0_2 = E/2^{10} = U$

Unit step for segment III is $\sigma_3 = 2U$

Unit step for segment IV is $\sigma_4 = 2^2U$

Unit step for segment V is $\sigma_5 = 2^3U$ . . .

Unit step for segment VIII is $\sigma_8 = 2^6U$ (26)

At the boundary between segments III and IV the step value $\gamma_{34}$ is obtained from equation (26)

$\gamma_{34} = (2U + 4U)/2 = 3U$ $\sigma_4 = 4U$ (27)

At the boundary between segments II and III the step value $\gamma_{23}$ is also given from equation (26) as $\gamma_{23} = 2U \neq (U + 2U)/2 = 1.5U$ $\sigma_3 = 2U$ (28)

Figure 9:
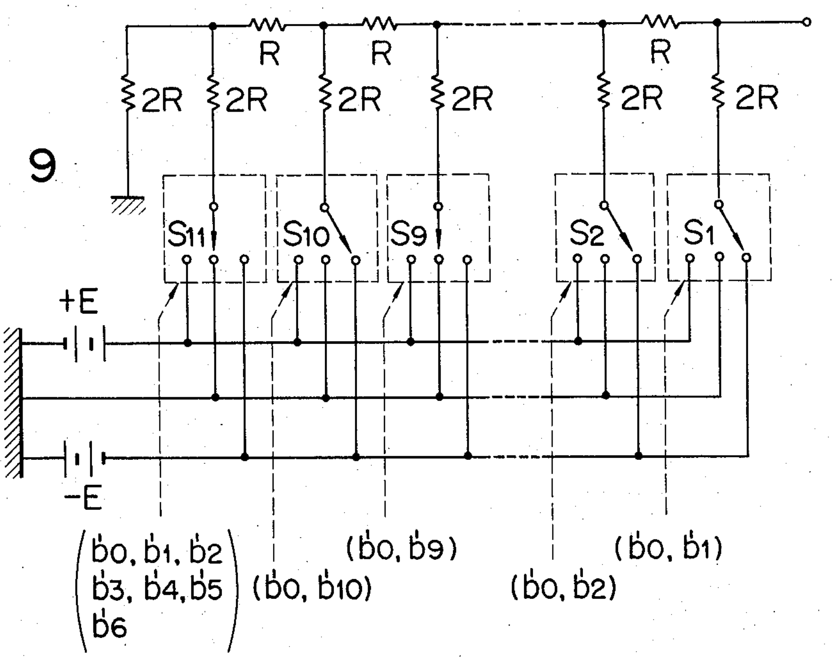
FIG. 9 is a circuit diagram showing a still another embodiment of the digital-to-analogue converting network according to the invention.

This difference stems from the fact that switch Sn is controlled by the logical equation (24). The most preferable embodiment of the decoder which improves the linearity of this decoding system is shown in FIG. 9. A major difference of the circuit shown in FIG. 9 from the circuit shown in FIG. 6 is that three different values of voltage are selected by the operation of switch Sn. Switches $Sj$ ($j = 1, 2, \ldots, n-1$) are controlled in the same manner a switches $Sj$ in the circuits of FIGS. 3 and 6. Switch Sn on the other hand, is controlled according to the following logical conditions:

i. When $b_0' = 1$ and $b_1' = b_2' = b_3' = b_4' = b_5' = b_6' = 0$, the voltage value is $+E$.

ii. When $b_0' = 0$ and $b_1' = b_2' = b_3' = b_4b' = b_5' = b_6' = 0$, the voltage value is $-E$.

iii. For the other cases the voltage value is 0. (29)

Figure 10:
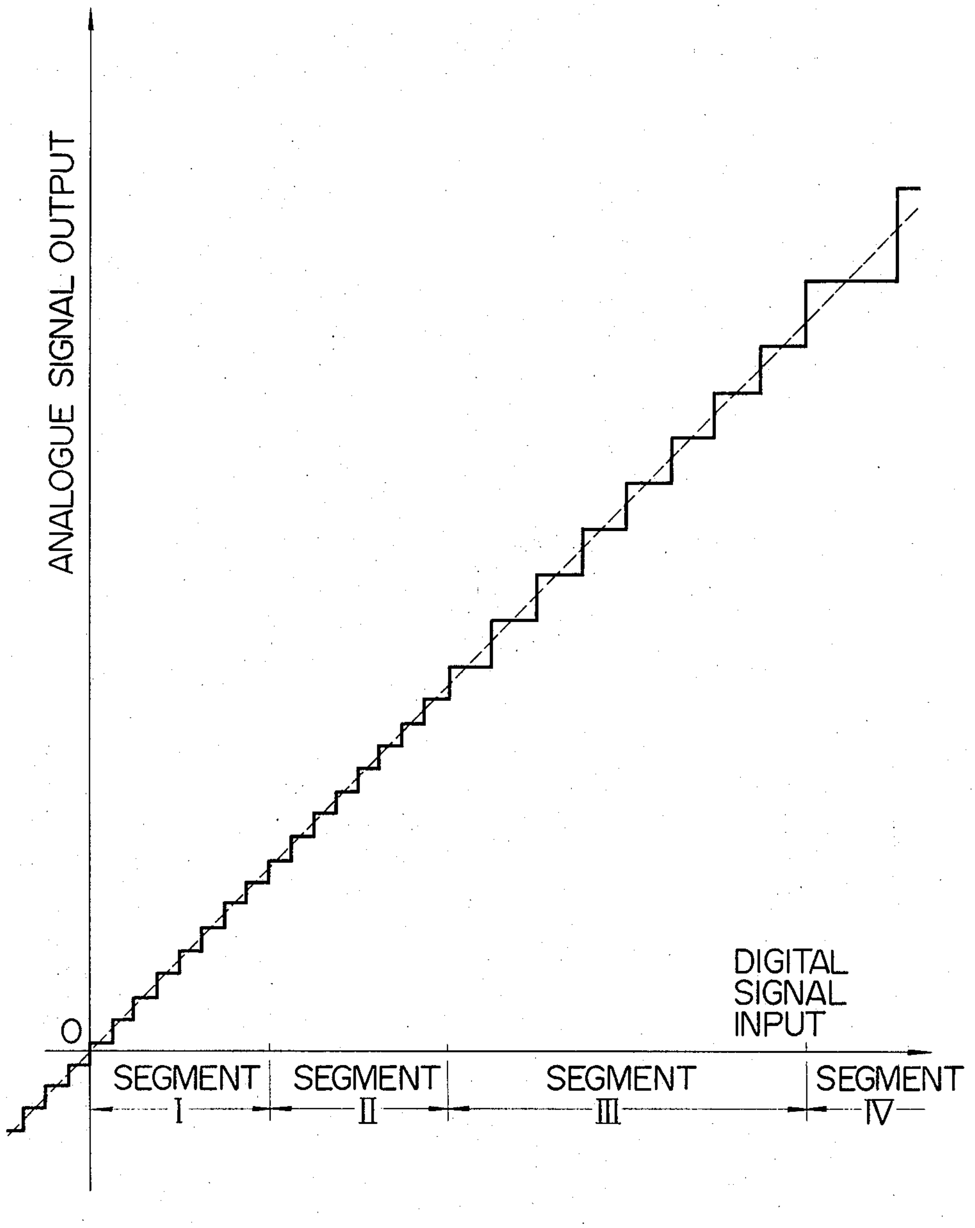
FIG. 10 is a plot for the decoding characteristic of the network shown in FIG. 9.

By controlling switch Sn such that equation (29) is satisfied, for segments I and II of the digital input signals the output signal is corrected by $E/2^n = V/2$ in the positive direction when the most significant digit is "1" and by $u/2$ in the negative direction when the most significant digit is "0". Therefore, the complete linear relation among the mean values of the decoding characteristic as shown in FIG. 10 is obtained, and the third-order distortion which has been inevitable may be eliminated.

Figure 11:
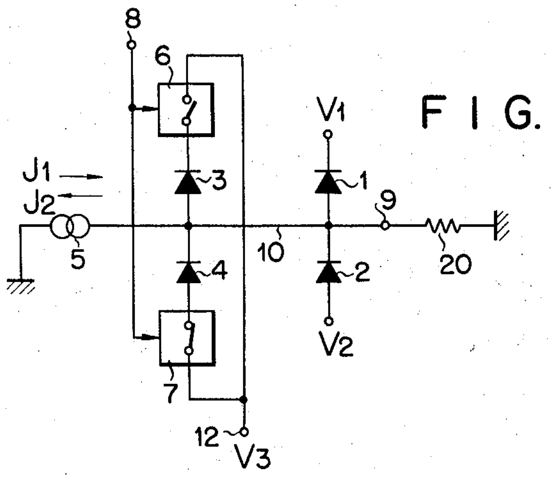
FIGS. 11 to 26 are circuit diagrams showing various embodiments of the unit circuit supplying voltages or currents of three different values to the decoding network in accordance with the invention.

The invention is now described in conjunction with various switching circuits used in the decoding system according to the invention. FIG. 11 shows a switching circuit which supplies the voltage given by equations (13) and (29) to the ladder network.

In this circuit resistor 20 inserted between terminal 9 and ground potential is the equivalent resistance of the ladder resistor network viewed from terminal 9. Terminal 9 is connected to common line 10 which is in turn connected to grounded current source 5. Current source 5 supplies one of the two currents $J_1$ and $J_2$, which have some constant magnitude but have opposite polarities. To common line 10 is also connected the anodes of diodes 1 and 3 and the cathodes of diodes 2 and 4. Upon the cathode of diode 1 is impressed voltage $V_1$ and upon the anode of diode 2 is impressed voltage $V_2$. The cathode of diode 3 and the anode of diode 4 are connected to terminal 12 through the switching elements 6 and 7 respectively and upon terminal 12 is impressed voltage $V_3$. Switching elements 6 and 7 are operated in opposite directions to each other with the control signal fed to terminal 8.

It is now assumed that voltages $V_1$, $V_2$ and $V_3$ are in the following relation, $$V_1 > V_3 > V_2$$

The operation of the switching circuit will now be described. At first, it is assumed that switching element 6 is turned on and then switching element 7 is turned off. Current $J_1$ out of current source 5 flows through diode 3 and switching element 6 to terminal 12 since $V_3 < V_1$. Thus terminal 9 is connected to the terminal 12 with voltage $V_3$. Current $J_2$ to be introduced into current source 5 flows from $V_2$ through diode 2, and upon terminal 9 is impressed voltage $V_2$. Next it is assumed that switching element 6 is turned off and then switching element 7 is turned on. Current $J_1$ from current source 5 flows through diode 1, and then terminal 9 has voltage $V_1$.

Current $J_2$ to be introduced into current source 5 flows from terminal 12 through switching element 7 and diode 4, since $V_3 > V_2$. At this time the terminal 9 has voltage $V_3$.

Thus, it is possible to supply one of the three voltages $V_1$, $V_2$ and $V_3$ by controlling the control signal fed to terminal 8 and the direction of current fed to current source 5.

Figure 12:
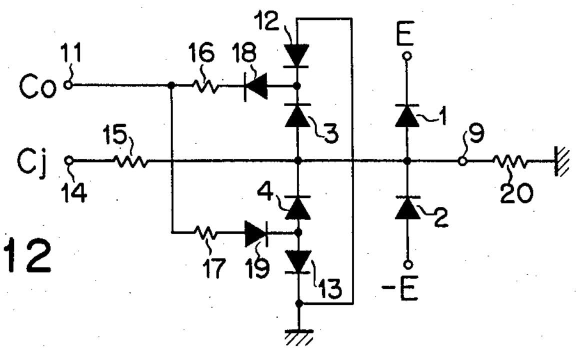

FIG. 12 illustrates a more detailed arrangement of the switching circuit showing in FIG. 11, with diodes 12 and 18 constituting switching element 6 and diodes 13 and 19 constituting switching element 7. To terminal 11 is supplied the signal of the most significant digit $C_0$, and to terminal 14 is supplied the signal of each digit $C_j$, where ($C_o$ $C_1$ . . . $C_{n-1}$) is the natural binary code. Signal $C_0$ is fed to diodes 18 and 19 through the resistor of high resistances 16 and 17 respectively. Similarly, signal $C_j$ is supplied through high resistance 15 to common line 10 and may be regarded to be the constant current source.

It is considered that in this circuit voltages "$+V$" and "$-V$" are impressed in correspondence with "1" and "0" of signals $C_0$ and $C_j$, and that voltage "$+E$" corresponds to $V_1$ in the circuit of FIG. 11, voltage "$-E$" corresponds to $V_2$, and ground potential corresponds to $V_3$. Voltages $V$ and $E$ are related as $|V|>|E|$ i. When $C_0=0\ (-V)$ and $C_j=0\ (-V)$, current flows from ground through diodes 12 and 18 and resistor 16 to terminal 11 as well as from $(-E)$ through diode 2 and resistor 15 to terminal 14. Thus, terminal 9 is supplied with voltage $(-E)$.

ii. When $C_0=1\ (+V)$ and $C_j=1\ (+V)$ current flows from the terminal 11 through resistor 17 and diodes 19 and 13 to ground as well as from terminal 14 through resistor 15 and diode 1 to $(+E)$. Thus, terminal 9 is supplied with voltage $(+E)$.

iii. When $C_0=0\ (-V)$ and $C_j=1\ (+V)$, current flows from terminal 14 through resistor 15, diodes 3 and 18 and resistor 16 as well as from ground through diodes 12 and 18 and resistor 16. Thus, terminal 9 is at ground potential.

iv. When $C_0=1\ (+V)$ and $C_j=0\ (-V)$, current flows from terminal 11 through resistor 17, diodes 19 and 4 and resistor 15 as well as from terminal 11 through resistor 17, diodes 19 and 13 to ground. Thus, terminal 9 is at ground potential.

As is apparent from the foregoing, this circuit satisfies equation (13).

Figure 13:
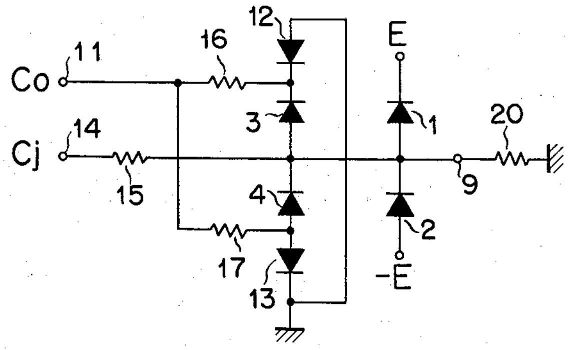

The circuit shown in FIG. 13 is obtained by eliminating diodes 18 and 19 from the circuit shown in FIG. 12, and operates similarly to the circuit of FIG. 12.

For either of the above switching circuits it is desirable that current through diodes 12 and 3 is substantially equal to current through diodes 13 and 4.

Figures 14, 15:
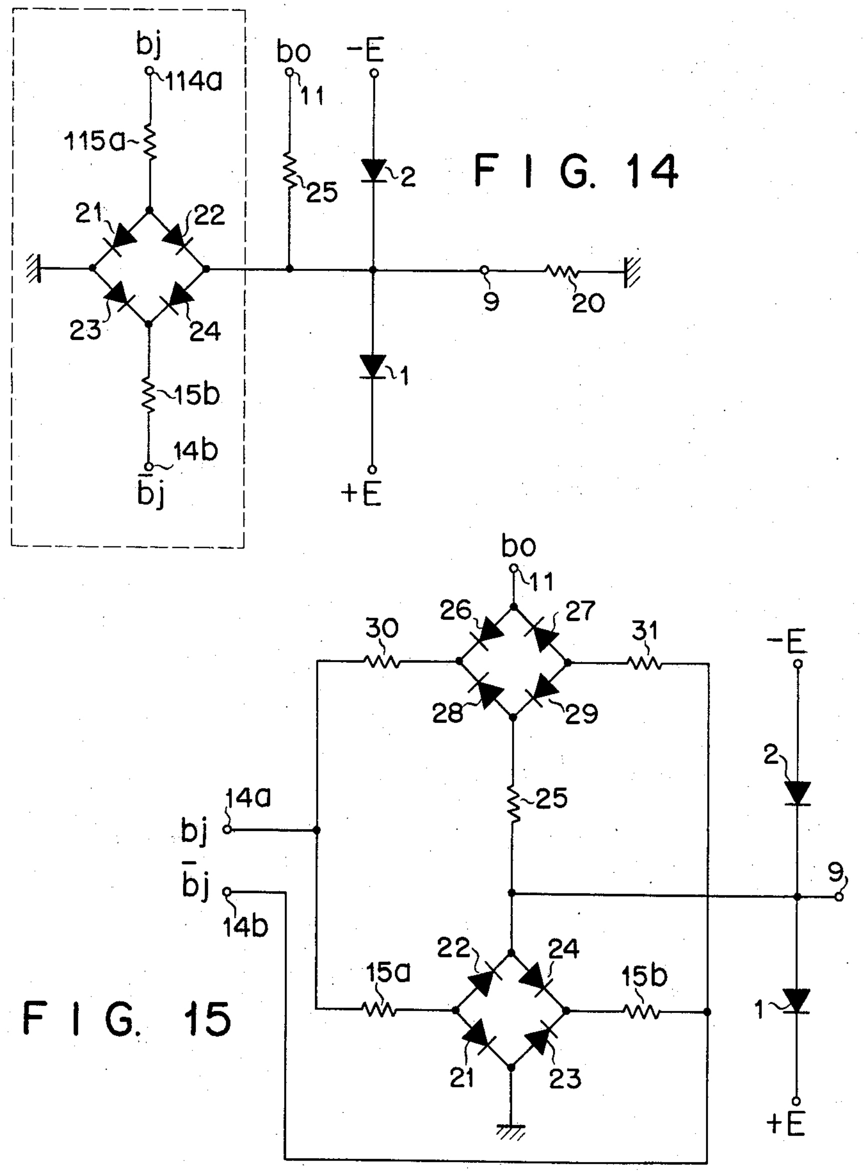

The circuits shown in FIGS. 14 and 15 use diode bridge gates consisting of four diodes.

In the circuit shown in FIG. 14 the bridge gate consists of diodes 21, 22, 23 and 24. The anodes of diodes 21 and 22 are connected through resistor 15a to terminal 14*a*, cathodes of diodes 23 and 24 are connected through resistor 15*b* to terminal 14*b*, the cathode of diode 22 and the anode of diode 24 are connected to terminal 9 which is connected through resistor 25 to terminal 11 to which is impressed the voltage $+V_1$ or $-V_1$ corresponding to the most significant digit $b_0$ of "1" or "0" respectively, and through resistor 20 to the ground, and through diodes 1 and 2 to $+E$ and $-E$, the cathode of diode 21 and the anode of diode 23 are grounded respectively. The cathode of diode 2 and the anode of diode 1 are connected to terminal 9. To input terminals 14*a* and 14*b* are supplied respective voltages $-V_2$ and $+V_2$ which are determined by each digit $b_j$ of the folded binary code.

This switching circuit is a voltage-driven type switching circuit where terminal 9 is supplied with reference voltage $+E$ or $-E$ when $b_j=1$, and with 0-voltage when $b_j=0$, for the relation between voltages $V_1$, $V_2$ and $E$ is $V_2>V_1>E$.

Therefore the operation of this switching circuit is satisfied with the following equation;

$$E_j=(2b_0-1)b_jE \tag{30}$$

where $(B_0\ b_1\ .\ .\ .\ b_{n-1})$ IS the folded binary code.

If the diodes have ideal switching characteristics of impedance zero or infinity in this circuit, then terminal 9 is at 0 potential for $b_j$ is equal to "0". However, as the actual diodes have finite impedance variable with current, this circuit does not operate an ideal voltage source and terminal 9 can not be supplied with exact voltage of $+E$, $-E$ or 0. This imperfection causes decoding errors.

The circuit shown in FIG. 15 is intended to improve the foregoing disadvantage and comprises a diode bridge gate consisting of diodes 26, 27, 28 and 29 and inserted between resistor 25 and input terminal 11, with the connection between diodes 26 and 28 connected through resistor 30 to input terminal 14*a* and the connection between 27 and 29 connected through resistor 31 to input terminal 14*b*.

Terminal 11 is controlled such that it is for instance, at +6 volts when $b_0=1$ and at −6 volts when $b_0=0$. Terminals 14*a* and 14*b* are controlled such that they are respectively at −9 volts and +9 volts for $b_j=1$ and at +9 volts and −9 volts for $b_j=0$. When $b_j=0$, the diode bridge gate consisting of diodes 26, 27, 28 and 29 is made off and the effect of $b_0$ is removed.

It is of course to be understood that known gate circuits may be used for each of the diode bridge gates so long as they perform the foregoing operation.

An embodiment of the current-driven type ladder resistor network is now described. The decoder output voltage from the current-driven type ladder resistor network with respect to folded binary code signal $(b_0\ b_1\ b_2\ .\ .\ .\ b_{n-1})$ and natural binary code signal $(C_0\ C_1\ .\ .\ .\ C_{n-1})$ are expressed as $$E_{out}=\frac{2RI}{3}\sum_{j=1}^{n-1}(2b_0-1)b_j\times\left(\frac{1}{2}\right)^{j-1}$$

$$=\frac{2RI}{3}\sum_{j=1}^{n-1}(C_0C_j-\bar{C}_0\bar{C}_j)\times\left(\frac{1}{2}\right)^{j-1} \tag{31}$$

Therefore the unit circuit shall supply a current $I_j$ of the following equation;

$$I_j=I(2b_0-1)b_j=I(C_0C_j-\bar{C}_0\bar{C}_j) \tag{32}$$

Figure 16:
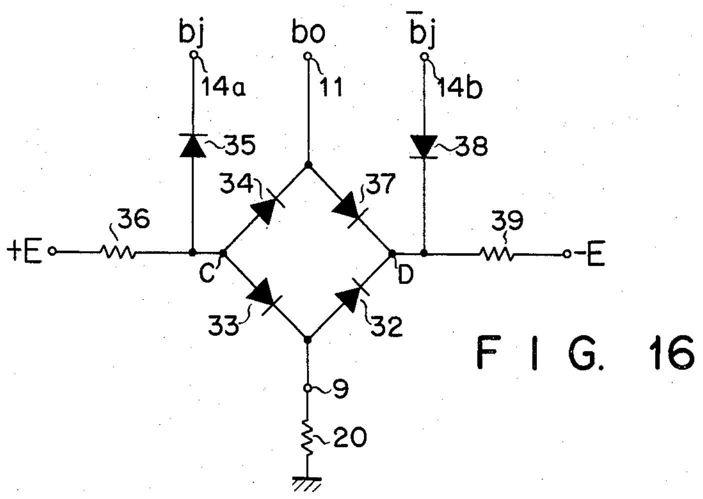

FIG. 16 shows a diode bridge circuit used as the current switch, where the value of a grounded resistor 20 is equal to the equivalent resistance of the ladder resistor network as viewed from terminal 9. To the free end of resistor 20 is connected the anode of diode 32, and the cathode of diode 33. The anode of diode 33 is connected with the anode of diodes 34 and 35, and through resistor 36 to a constant voltage $+E$. The cathode of diode 34 is connected with the anode of diode 37 and the input terminal 11 to which the most significant digit $b_0$ of the folded binary code is supplied.

Further, the cathode of diode 37 is connected with the cathodes of diodes 32 and 38 and through resistor 39 to a constant voltage $-E$.

The cathode of diode 35 and the anode of diode 38 are respectively connected with the terminals 14*a* and 14*b* to which corresponding digit $b_j$ of the folded binary code is supplied with opposite polarities.

The above described circuit is a switching circuit supplying currents $+I$ or $-I$ when $b_j=1$ and no current when $b_j=0$ to the current-driven type network. The magnitude of current I depends on the value of the voltage source and resistors 36 and 39. Terminal 11 is controlled by the most significant digit alternatively $b_0$ so as to be for instance, +2 volts when $b_0=1$ and −2 volts when $b_0=0$. Terminals 14*a* and 14*b* are controlled by each digit $b_j$ so as to be, for instance, +2 volts and −2 volts respectively, when $b_j=1$, and −2 volts and +2 volts when $b_j=0$. It is also assumed that, $E$ is equal to 12 volts and silicon diodes with a forward voltage drop of about 0.7 volts are used here. First, when $b_0=b_j=1$, terminal 14*a* and 11 are at +2 volts, and terminal 14*b* at −2 volts. Diodes 33 and 37 are forward-biased with little resistance, while diodes 32, 34, 35 and 38 are backward-biased with very high resistance. The voltage at point D is 1.3 volts and that at point C is 1.2 volts because of forward voltage drop across the diodes provided that terminal 9 is at 0.5 volts owing to the output current. Now a current flows from terminal 11 to the voltage source $-E$ and another from the voltage source $+E$ to terminal 9, as the output current of the switching circuit. Second, when $b_0 = 0$ and $b_j = 1$, diodes 33, 34, 37 and 38 are turned off and current $'I$ is supplied from $-12$ volts terminal through resistor 39 and diode 32 to resistor 20. Third, when $b_0 = 1$ and $b_j = 0$, and $b_0 = 0$ and $b_j = 0$ both 33 and 32 are turned off, so that there flows no current through resistor 20. The voltage furnished to terminals 11, 14*a* and 14*b* may be desirably selected that the foregoing operation is ensured. Current I supplied to the ladder network is determined by the magnitude of the required analogue output, thus determine voltage $E$ and resistors 36 and 39. When very high resistance is required for resistor 36 and 39, the voltage sources and resistors may, of course, be replaced by constant current circuits consisting of transistors and the like.

Figure 17:
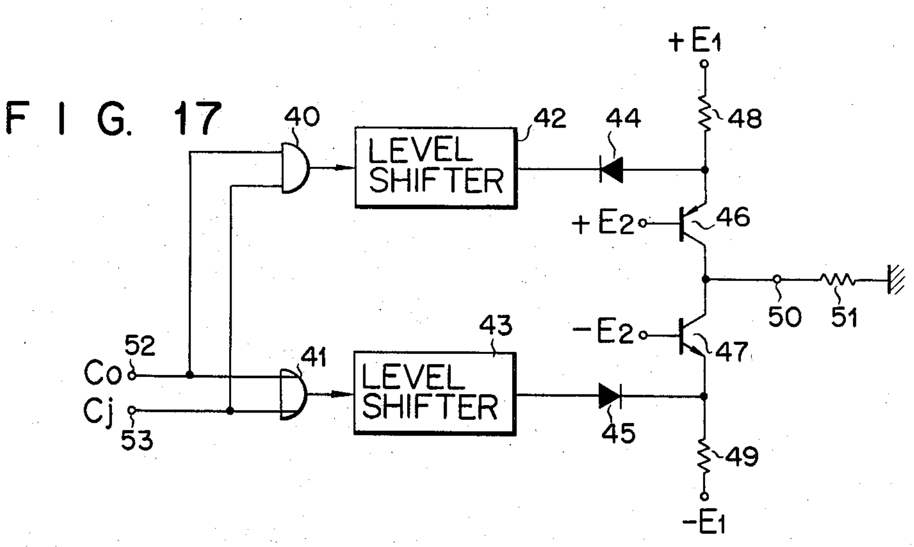

The circuit shown in FIG. 17 has AND gate 40 and OR gate 41 driven by natural binary code signal $C_0$ and $C_j$. The output of the gates are supplied to respective level shifters 42 and 43. By way of example, level shifter 42 shifts the output level of AND gate 40 to +6 volts for "1" and to +4 volts for "0", while level shifter 43 shifts the output level of OR gate to −4 volts for "1" and to −6 volts for "0". The level-shifted signal is supplied through diodes 44 and 45 to the emitters of *p-n-p* transistors 46 and *n-p-n* transistor 47 for switching. Resistors 48 and 49 are durrent-limiting resistors across which are applied voltages $E_1$ and $-E_1$. To the bases of transistors 46 and 47 are applied constant voltages $+E_2$, and $-E_2$, whose values are, for instance, $|E_1| = 20$ volts and $|E_2| = 5$ volts.

The collectors of transistors 46 and 47 are connected together to terminal 50 which is in turn connected to grounded resistor 51 which is the equivalent resistance of the ladder circuit as viewed from terminal 50.

The operation of this switching circuit with the signals fed to the input terminals 52 and 53 is now described.

i. When $(C_0\, C_1 \ldots C_{n-1})$ is natural binary code signal and $C_0 = C_j = 0$, both of the outputs of AND gate 40 and OR gate 41 are "0", so that the output voltage of level shifter 42 is +4 volts and the output voltage of level shifter 43 is −6 volts. As a result diode 44 is turned on. The emitter voltage for transistor 46 is 4.7 volts because of forward voltage drop of the diode. As the base voltage for transistor 46 is 5 volts or 0.3 volts higher than the emitter voltage, transistor 46 is turned off. With a forward voltage drop from the base to the emitter of transistor 47 amounting to 0.7 volts (for silicon transistor) the emitter voltage is −5.7 volts, so that transistor 47 is turned on and diode 45 is turned off, causing current to flow from ground through resistor 51, transistor 47 and resistor 49. This current is defined as the negative current "$-I$".

ii. When $C_0 = C_j = 1$, outputs from both AND gate 40 and OR gate 41 are "1", so that the output voltage of level shifter 42 is +6 volts and the output voltage of level shifter 43 is −4 volts. As a result, diode 44 is turned off and the emitter voltage for transistor 46 is +5.7 volts. Thus, transistor 46 is turned on, and current flows through transistor 48, transistor 46 and resistor 51. This current is a positive current "$+I$". On the other hand, diode 45 is turned on to provide −4.7 volts for the emitter of transistor 47 so as to turn it off.

iii. When $C_0 \neq C_j$, output from AND gate 40 is "0", so that transistor 46 is turned off as in the above case (i). On the other hand, output from OR gate 41 is "1", so that transistor 47 is turned off as in the above case (ii).

Figure 18:
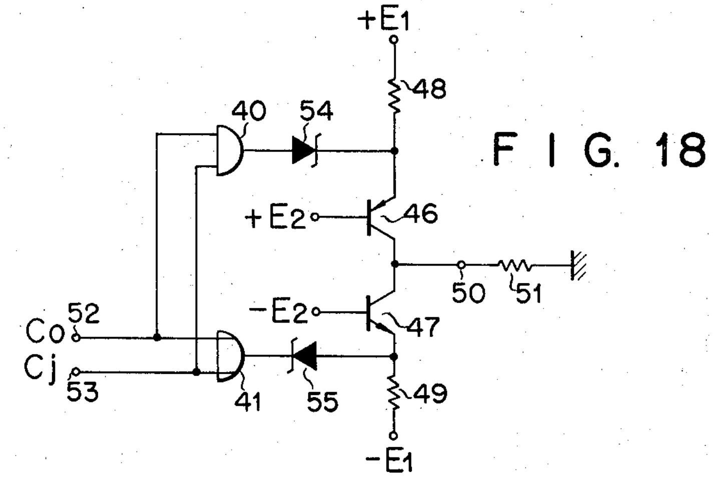

In the switching circuit shown in FIG. 18, the level shifters and switching diodes of the switching circuit shown in FIG. 17 are operated by means of voltage regulator diodes, for instance, Zener diodes 54 and 55.

Figures 19, 20, 21:
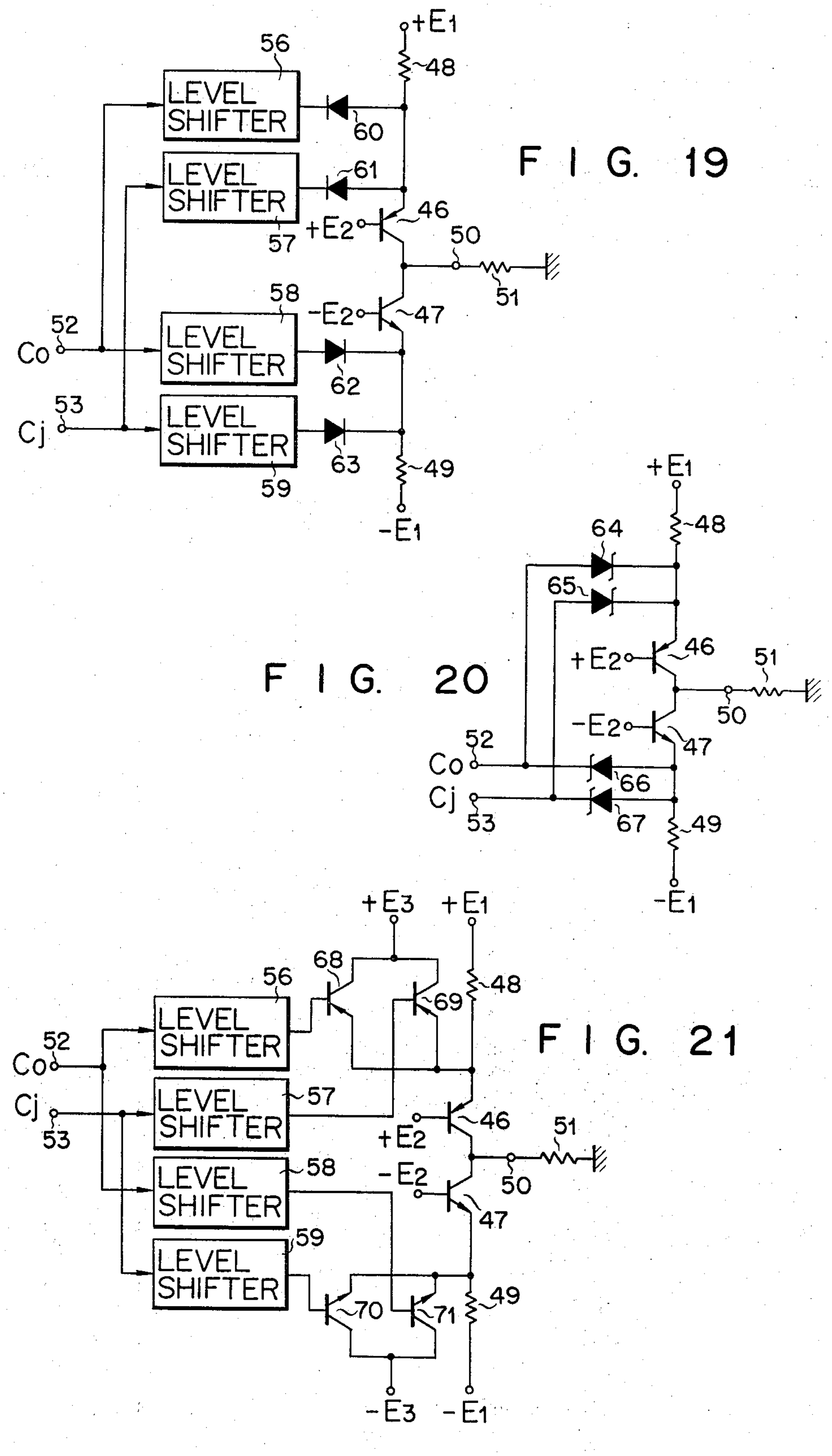

The circuit shown in FIG. 19 is a modification of the switching circuit shown in FIG. 17. In this embodiment, between terminal 52 and the emitter of transistor 46 is inserted a series circuit of level shifter 56 and diode 60, and between terminal 52 and the emitter of transistor 47 is inserted a series circuit of level shifter 58 and diode 62. Similarly, between terminal 53 and the emitter of transistor 46 is connected a series circuit of level shifter 57 and diode 61, and between terminal 53 and the emitter of transistor 47 is inserted a series circuit of level shifter 59 and diode 63. In this circuit, the switching of AND gate is made by diodes 60 and 61, and the switching of OR gate is made by diodes 62 and 63.

In the circuit shown in FIG. 20 the level shifters and switching diodes in the switching circuit shown in FIG. 19 are operated by means of voltage regulator diodes, for instance, Zener diodes 64, 65, 66 and 67.

The switching circuit shown in FIG. 21 replaces diodes 60 to 63 in the circuit shown in FIG. 19 with *p-n-p* transistors 68 and 69 and *n-p-n* transistors 70 and 71, with $+E_3$ impressed upon the collector of transistors 68 and 69 and $-E_3$ impressed upon the collector of transistors 70 and 71. For the operation of this circuit there is preset a relation $$E_1, E_3 > E_2.$$

Such use of transistors favorably quickens operation.

Figure 22:
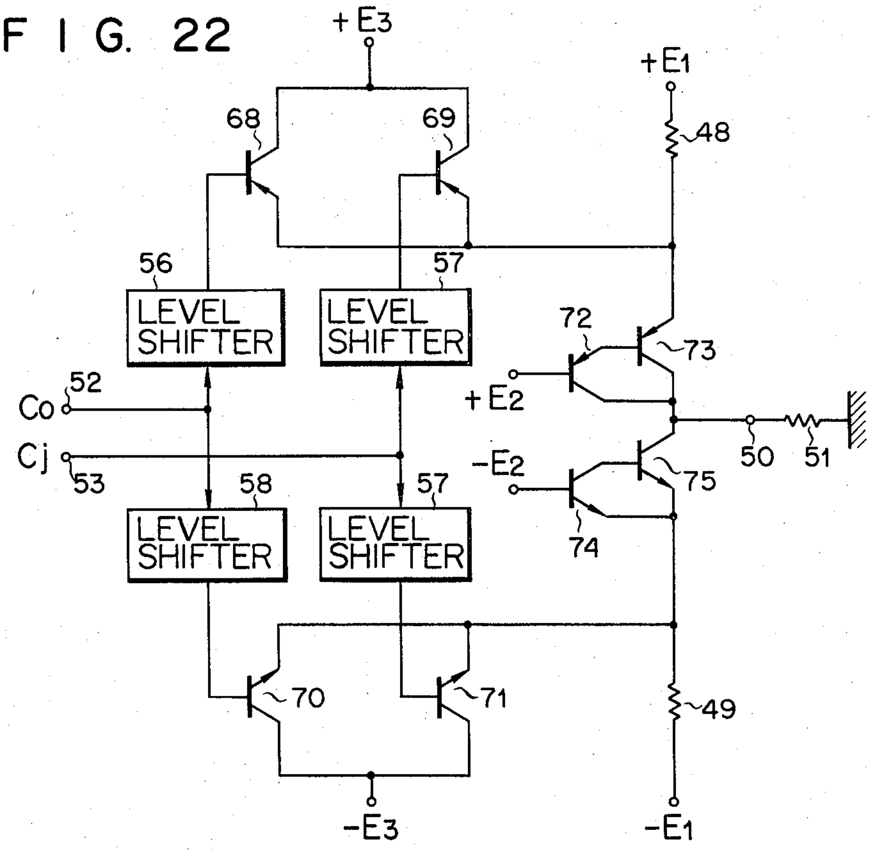

The circuit shown in FIG. 22 uses a Darlington connection circuit consisting of respective pairs of transistors 72, 73 and 74, 75. In this circuit, there is obtained a high impedance when the current source side is looked from current supply terminal 50, thus reducing the effects upon the ladder network to the advantage.

Figure 23:
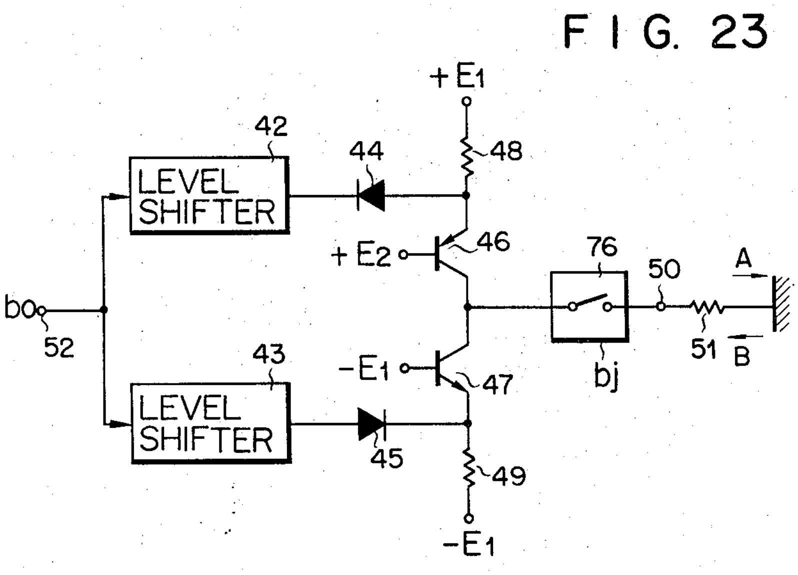

The circuit shown in FIG. 23 is another embodiment of the switching circuit for the current-driven type ladder network.

In this circuit, the most significant digit of folded binary code $b_0$ is fed to terminal 52 and between terminal 52 and the emitters of *p-n-p* transistor 46 and *np-n* transistor 47 are inserted level shifters 42 and 43 and diodes 44 and 45. The collectors of *p-n-p* and *n-p-n* transistors 46 and 47 are jointly connected to gate 76, which is controlled by the respective digit of folded binary code $b_j$ so as to be turned on when digit $b_j$ is "1". The emitters of transistors 46 and 47 are connected to respective current limiting resistors 48 and 49, and voltage $+E_1$ is supplied to resistor 48 and voltage $-E_1$ is supplied to resistor 49. The base of transistor 46 is supplied with voltage $+E_2$ and the base of transistor 47 is supplied with voltage $-E_2$. Between terminal 50 and the ground is inserted the equivalent resistor 51 of the ladder network as viewed from terminal 50. As in the switching circuit shown in FIG. 17, the output voltage of level shifter 42 is +6 volts for $b_0 = 1$ and +4 volts for $b_0 = 0$, and the output voltage of level shifter 43 is −4 volts for $b_0 = 1$ and −6 volts for $b_0 = 0$. The impressed voltages are $$|E_1| = 20 \text{ volts and } |E_2| = 5 \text{ volts.}$$

The operation of this switching circuit is as follows:

i. When $b_j = 0$, gate 76 is turned off, so that current is not supplied to the ladder network.

ii. When $b_0 = 1$ and $b_j = 1$, the output voltage is level shifter 42 is +6 volts and the emitter voltage for transistor 46 is +5.7 volts, so that diode 44 is turned off and transistor 46 is turned on. Thus, through resistor 48, transistor 46 and gate 76 to resistor 51 flows current in direction A (positive current). On the other hand, as the output voltage of level shifter 43 is −4 volts and the emitter voltage of transistor 47 is −4.7 volts, so that diode 45 is turned on and transistor 47 is turned off.

iii. When $b_0 = 0$ and $b_j = 1$, the output voltage of level shifter 43 is −6 volts and the emitter voltage of transistor 47 is −5.7 volts, so that diode 45 is turned off and transistor 47 is turned on. Thus, current flows through resistor 49, transistor 47 and gate 76 to resistor 51 (negative current). On the other hand, the output voltage of level shifter 42 is +4 volts and the emitter voltage of transistor 46 is 4.7 volts, so that diode 44 is turned on and transistor 46 is turned off.

Figures 24, 25, 26:
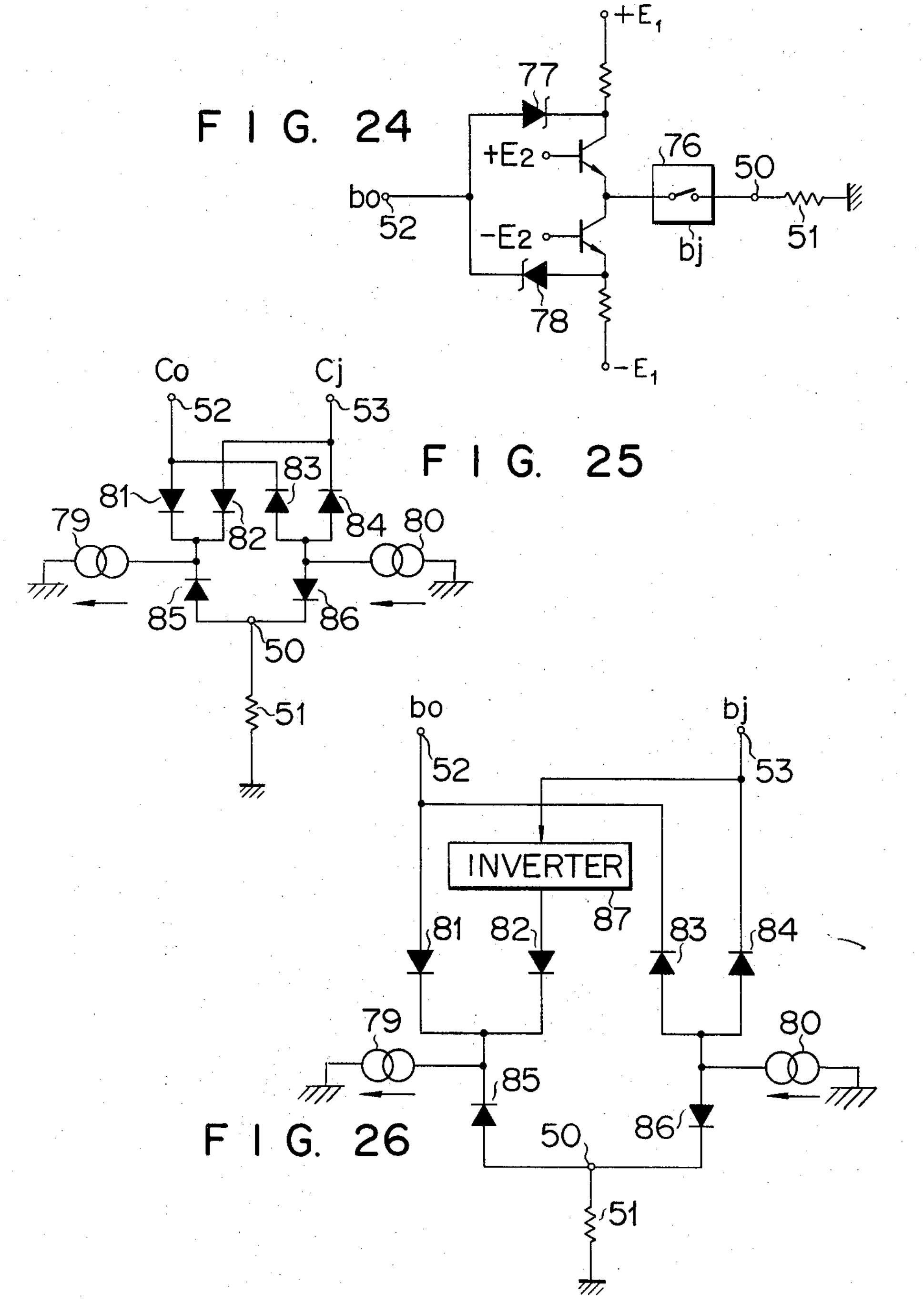

The same results as described above may be obtained even by replacing the level shifters and switching diodes of this switching circuit with voltage regulator diodes such as Zener diodes 77 and 78 as shown in FIG. 24.

The switching circuit shown in FIG. 25 consists of diodes and a current source supplying current in the direction of the indicated arrows. To current source 79 are connected the cathodes of diodes 81, 82 and 85. The anode of diode 81 is connected to terminal 52, to which is supplied the most significant digit $C_0$ of the natural binary code. The anode of diode 82 is connected to terminal 53, to which is supplied digit $C_j$ of the natural binary code. The anode of diode 85 is connected to terminal 50 which is in turn connected to resistor 51, which is the equivalent resistor of the ladder network as viewed from current supply terminal 50. The diodes connected to current source 80 are substantially symmetrical with the diodes connected to current source 79 except for the polarity; to current source 80 are connected the anodes of diodes 83, 84 and 86. The cathode of diode 83 is connected to terminal 52, and the cathode of diode 84 is connected to terminal 53. The cathode of diode 86 is connected to current supply terminal 50. The voltage applied to terminals 52 and 53 of this circuit are +5 volts for signal "1" and −5 volts for signal "0", and the forward voltage drop in each of the diodes is approximately 0.7 volts.

The operation of this switching circuit is as follows:

i. When $C_0 = C_j = 0$, (−5volts) diodes 81 and 82 are supplied with a reverse voltage and is turned off. Diodes 83 and 84 are supplied with a forward voltage and carry current from current source 80. As a result, the voltage at the anodes of diodes 83 and 84 amounts to −4.3 volts to turn off diodes 86. Thus, current (negative current) flows from ground through resistor 51 and diode 85 to current source 79.

ii. When $C_0 = C_j = 1$ (+5 volts) diodes 83, 84 and 85 are turned off and diodes 81, 82 and 86 are turned on in contrast to the aforementioned case (i). Thus, current (positive current) flows from current source 80 through diode 86 and resistor 51.

iii. When $C_0 = 0$ (−5 volts) and $C_j = 1$ (+5 volts), diodes 81, 84, 85 and 86 are turned off and diodes 82 and 83 are turned on. Current flows from terminal 53 through diode 82 to current source 79. On the other hand, current from current source 80 flows through diode 83 to terminal 52. In this case there is no current passing through resistor 51.

iv. When $C_0 = 1$ (+5 volts) and $C_j = 0$ (−5 volts), diodes 82, 83, 85 and 86 are turned off and diodes 81 and 84 are turned on. Current flows from terminal 52 through diode 81 to current source 79. Current from current source 80 flows through diode 84 to terminal 53.

The switching circuit shown in FIG. 26 is suited for the decoding of the folded binary code signal ($b_0\ b_1 \ldots b_{n-1}$). It is constructed by inserting inverter 87 between diode 82 and terminal 53 of the switching circuit shown in FIG. 25. with the most significant digit signal $b_0$ fed to terminal 52 and digit $b_j$ fed to terminal 53.

Current $I_j$ supplied from this switching circuit to resistor 51 may be expressed by the equation:

$$I_j = (2b_0 - 1)\ b_j I \qquad (33)$$

Accordingly, when digit signal $b_j$ fed to terminal 53 is "0" (−5 volts), diodes 82 and 84 are turned on, and current does not flow through resistor 51. When digit signal $b_j$ is "1" (+5 volts) the polarity of current passing through resistor 51 is determined by $b_0$ supplied to terminal 52. The switching action of each diode is substantially the same as in the switching circuit shown in FIG. 19.

What we claim is:

1. A decoding system adapted for use in a non-linear companding voice PCM communication system for decoding a digital signal composed of a plurality of digits into an analogue voice signal, comprising:

a network including a plurality of signal supply terminals, each corresponding to respective digits of the digital signal being decoded; an output terminal; and means coupling said signal supply terminals to said output terminal;

a source of d.c. signals of three different values, $+E$,0 and $-E$;

a plurality of single stage switching circuits each corresponding to a respective signal supply terminal, single stage switching circuit including means responsive to signals representing the states of the most significant digit and another digit of said digital signal for selectively supplying one of said d.c. signals of three different values from said signal to said respective signal supply terminals; and a further switching circuit including means responsive to a signal representing the state of the most significant digit of said digital signal for supplying one of said d.c. signals of three different values from said signal source to a predetermined signal supply terminal to generate an analogue signal corresponding to said digital signal at said output terminal;

each of said switching circuits including a bridge circuit comprised of a plurality of diodes (21–24) connected in a bridge configuration, first and second resistors (15$a$, 15$b$) connected at one end to the respective common electrode junctions of pairs of said bridge diodes and at the other end to respective first and second terminals (14$a$, 14$b$) supplied with digit signals ($b_j$ and $\overline{b}_j$, respectively). means coupling another junction of said bridge diodes (21, 23) to ground, a third resistor (25) connected at one end to the remaining junction of said bridge diodes (22, 24) and at the other end to a digit terminal (11) supplied with the most significant digit signal ($b_0$), a common line connected between said remaining junction of said bridge diodes (22, 24) and the signal supply terminal (9), a first diode (2) having its cathode connected to said common line and its anode supplied with signal $-E$, and a second diode (1) having its anode connected to said common line and its cathode supplied with signal $+E$.

2. A decoding system according to claim 1 comprising: a second bridge circuit including a plurality of diodes (26 – 29) connected between said third resistor (25) and said digit terminal (11), a fourth resistor (30) connected between a common electrode junction of said diodes (26, 28) of said second bridge circuit and said first terminal (14$a$), and a fifth resistor (31) connected between the other common electrode junction of said diodes (27, 29) of said second bridge circuit and said second terminal (14$b$).

3. A decoding system according to claim 1 wherein said further switching circuit further includes means responsive to a signal representing the state of the predetermined ones of said digital signal for supplying one of said D.C. signals of three different values from said signal source to at least one of said signal supply terminals, to thereby generate an analogue signal corresponding to said digital signal at said output terminal and eliminating third order distortion in the decoding of said digital signal.

4. A decoding system according to claim 1 wherein said network comprises a voltage-driven ladder resistor network.

5. A decoding system for decoding a digital signal composed of a plurality of digits into an analogue signal, comprising: a source of first and second and third voltages ($V_1$, $V_2$ and $V_3$); a voltage driven ladder resistor type network having a plurality of signal supply terminals; and a plurality of switching circuits is respectively connected to individual signal supply terminals and responsive to said digits of said digital signal for selectively supplying said signal supply terminals with three different values of voltage depending upon the digital signal, said switching circuits each including a common line (10) connected to the corresponding one of said signal supply terminals, a current source (5) connected to said common line (10) and supplying positive or negative current in accordance with said digital signal a first diode (1) whose anode is connected to said common line (10) and whose cathode is impressed with said first voltage ($V_1$), a second diode (2) whose cathode is connected to said common line (10) and whose anode is impressed with said second voltage ($V_2$), a third diode (3) whose anode is connected to said common line (10), a fourth diode (4) whose cathode is connected to said common line (10), a first switching element (6) controlled by said digital signal and having one terminal thereof connected to the cathode of said third diode (3) and the other terminal thereof impressed with said third voltage ($V_3$), and a second switching element (7) performing an opposite action to said first switching circuit (6) and having one terminal thereof connected to the anode of said fourth diode (4) and the other terminal thereof impressed with said third voltage ($V_3$), wherein said first, second and third voltages ($V_1$, $V_2$ and $V_3$) have a relation to each other as follows:

$$V_1 > V_3 > V_2.$$

* * * * *

UNITED STATES PATENT OFFICE
CERTIFICATE OF CORRECTION

Patent No. 3,810,158 Dated May 7, 1974

Inventor(s) Junzo MURAKAMI et al

It is certified that error appears in the above-identified patent and that said Letters Patent are hereby corrected as shown below:

On initial page of patent, under the heading of

Foreign Application Priority Data change priority data to:

| | |
|---|---|
| --September 26, 1968 | Japan...........69116/68 |
| September 26, 1968 | Japan...........69117/68 |
| November 14, 1968 | Japan...........82854/68 |
| November 15, 1968 | Japan...........83226/68 |
| November 20, 1968 | Japan...........84524/68--. |

Signed and sealed this 29th day of October 1974.

(SEAL)
Attest:

McCOY M. GIBSON JR.
Attesting Officer

C. MARSHALL DANN
Commissioner of Patents